(12) United States Patent
Navon et al.

(10) Patent No.: US 11,210,183 B2
(45) Date of Patent: Dec. 28, 2021

(54) MEMORY HEALTH TRACKING FOR DIFFERENTIATED DATA RECOVERY CONFIGURATIONS

(71) Applicant: Western Digital Technologies, Inc., San Jose, CA (US)

(72) Inventors: Ariel Navon, Revava (IL); Alex Bazarsky, Holon (IL); Eran Sharon, Rishon Lezion (IL); Idan Alrod, Herzeliya (IL)

(73) Assignee: Western Digital Technologies, Inc., San Jose, CA (US)

(*) Notice: Subject to any disclaimer, the term of this patent is extended or adjusted under 35 U.S.C. 154(b) by 33 days.

(21) Appl. No.: 16/741,952

(22) Filed: Jan. 14, 2020

(65) Prior Publication Data

US 2021/0216412 A1 Jul. 15, 2021

(51) Int. Cl.
*G06F 12/00* (2006.01)
*G06F 11/14* (2006.01)
*G06F 3/06* (2006.01)
*G06F 11/30* (2006.01)
*G06F 11/07* (2006.01)

(52) U.S. Cl.
CPC .......... *G06F 11/1469* (2013.01); *G06F 3/067* (2013.01); *G06F 3/0614* (2013.01); *G06F 3/0653* (2013.01); *G06F 11/076* (2013.01); *G06F 11/1451* (2013.01); *G06F 11/1461* (2013.01); *G06F 11/1464* (2013.01); *G06F 11/3034* (2013.01)

(58) Field of Classification Search
CPC ............... G06F 11/1469; G06F 11/076; G06F 11/1451; G06F 11/1461; G06F 11/1464; G06F 11/3034; G06F 11/1446; G06F 11/1076; G06F 3/0614; G06F 3/0653; G06F 3/067; G06F 3/0646; G06F 3/0683; G06F 3/0689; G06F 12/0238; G06F 12/0246
See application file for complete search history.

(56) References Cited

U.S. PATENT DOCUMENTS 5,278,838 A * 1/1994 Ng ..................... G11B 20/1833
714/6.12
7,415,585 B1 * 8/2008 Rossi .................. G06F 11/1458
711/161

(Continued)

FOREIGN PATENT DOCUMENTS

EP 2972875 A2 1/2016

OTHER PUBLICATIONS

International Search Report and Written Opinion of Application No. PCT/US2020/035432, dated Sep. 23, 2020 (9 pages).

*Primary Examiner* — Shawn X Gu
(74) *Attorney, Agent, or Firm* — Patent Law Works LLP

(57) ABSTRACT

Example systems and methods provide differentiated data recovery configurations based on memory health data. A distributed storage system, such as a cloud-based storage system, stores backup data from a remote storage device using a first data recovery configuration. Based on memory health data collected from the remote storage device, a change in a memory health state of the remote storage device may be determined. Responsive to the change in the memory health state, a different data recovery configuration may be used for storing backup data going forward and reallocating previously stored backup data in the distributed storage system.

20 Claims, 7 Drawing Sheets

(56) References Cited

U.S. PATENT DOCUMENTS 9,098,456 B2 8/2015 Grabarnik et al.
2012/0084261 A1 4/2012 Parab
2013/0124932 A1 5/2013 Schuh et al.

* cited by examiner

MEMORY HEALTH TRACKING FOR DIFFERENTIATED DATA RECOVERY CONFIGURATIONS

TECHNICAL FIELD

The present disclosure generally relates to data storage, and in a more particular example, to data recovery configurations in backup data storage.

BACKGROUND

Edge storage devices, such as computer hard drives, external hard drives, removable solid-state storage (e.g. flash drives), etc., may benefit from remote backup solutions to prevent data loss in the event of degradation or loss of the edge storage device. For example, such storage devices may be configured for periodic backup to a cloud-based storage system. The cloud-based storage system may provide a storage application for interacting with the edge storage device, enabling backup configuration, and receiving the data from the storage device to be backed up. In some configurations, the storage application may provide an interface function for a distributed storage system that supports backups or other data storage applications for a plurality of end users.

Often, distributed storage systems are used to store large amounts (e.g., terabytes, petabytes, exabytes, etc.) of data, such as objects or files in a distributed and fault tolerant manner with a predetermined level of redundancy. Such distributed storage systems may be particularly advantageous as active backup destinations for edge storage devices.

These large-scale storage systems may support the storage of data that is erasure coded and distributed across many storage devices. Data, such as files or objects, may be split into messages or similar data units which have an upper bound in size. These data units are then split up into a number of symbols. The symbols are then used as input for erasure coding. For example, when using a systematic erasure coding algorithm, the output of the erasure coding process yields the original symbols and a fixed number of additional parity symbols. The sum of these symbols are distributed among a selection of storage devices.

While erasure coding may enable a greater level of redundancy and increased tolerance of error rates for recovering data, the processing, storage space, and other storage resources needed still represent a substantial cost to the storage provider. More specifically, the selection of parity level and other aspects of data recovery configurations may increase or decrease the processing, storage space, network bandwidth, and other resources needed for storage and recovery. The storage provider may need to balance the storage resources allocated to the backup of any given edge storage device against desired data backup and recovery service levels.

It may be possible to determine a general recovery configuration for the backup of edge storage devices. However, individual storage devices are known to have different actual usage, error rates, and degradation. A general configuration may be based on an average or worst-case performance of the storage device and, therefore, allocate more or less storage resources to backup than is actually warranted by the present condition of the storage device.

When using distributed storage systems to provide backup of edge storage devices, allocation of storage resources for fixed criteria based on worst-case scenarios for the population of storage devices may result in wasted storage resources and/or unnecessary risk of data loss. A need exists for adaptive diverse backup according to the actual risk to the data at a current point of time for a specific storage device. For example, storage systems that receive memory health data from individual storage devices and use that memory health data to allocate storage resources through differentiated data recovery configurations may be needed.

SUMMARY

Various aspects for storing redundant backup data from storage devices to distributed storage systems, particularly, using memory health tracking to differentiate data recovery configurations for individual storage devices are described.

One general aspect includes a computer-implemented method. The computer-implemented method includes storing, using a first data recovery configuration, a redundant set of data from a remote storage device in a distributed storage system; receiving memory health data associated with the remote storage device, where the memory health data corresponds to a memory health state of a non-transitory medium of the remote storage device; determining, based on the memory health data, a change in the memory health state of the non-transitory medium of the remote storage device; and reallocating, using a second data recovery configuration, the redundant set of data in the distributed storage system responsive to the change in the memory health state.

Implementations may include one or more of the following features. The remote storage device may be a non-volatile memory device at a site that is remote from the distributed storage system and reallocating the redundant set of data in the distributed storage system may include periodically backing up a difference between a current set of data stored on the remote storage device and a comprehensive copy of data stored on the remote storage device at an earlier time. The computer-implemented method may further include: determining a periodic backup configuration for the remote storage device; determining at least one initial memory health value for the remote storage device; and determining, based on the at least one initial memory health value and the periodic backup configuration, the first data recovery configuration. The computer-implemented method may further include: determining a service level for at least one system resource of the distributed storage system; determining, based on the service level, an allocation of the at least one system resource to storing the redundant set of data in the distributed storage system, where determining the first data recovery configuration is further based on the allocation of the at least one system resource; and determining, based on the allocation of the at least one system resource and the change in memory health, the second data recovery configuration. Storing, using the first data recovery configuration, the redundant set of data in the distributed storage system may include encoding the redundant set of data in a first plurality of encoded data symbols according to a first parity level. Reallocating, using the second data recovery configuration, the redundant set of data in the distributed storage system may include encoding at least a portion of the redundant set of data in a second plurality of encoded data symbols according to a second parity level. The second parity level may accommodate a different error rate for recovery of the portion of the redundant set of data than the first parity level. The memory health data may include at least one memory health value selected from: a bit error rate value; a write/erase cycles value; a program loop counter value; an erase loop counter value; a leak detection measurement value; an erratic program disturbance value; a bad blocks value; or a voltage margin value. The computer-implemented method may further include receiving the redundant set of data from the remote storage device according to a periodic backup schedule, wherein receiving memory health data from the remote storage device is executed in conjunction with receiving the redundant set of data according to the periodic backup schedule. The computer-implemented method may further include: determining a plurality of physical storage units in the remote storage device; and storing reference values that associate the redundant set of data stored in the distributed storage system with the plurality of physical storage units storing corresponding data in the remote storage device. Receiving memory health data from the remote storage device may include receiving at least one memory health value for each physical storage unit of the plurality of physical storage units. Determining the change in the memory health state may include: determining at least one memory health value for a first physical storage unit of the plurality of physical storage units fulfills a decreased reliability condition; and determining at least one memory health value for a second physical storage unit of the plurality of physical storage units does not fulfill the decreased reliability condition. Reallocating, using the second data recovery configuration, the set of redundant data in the distributed storage system may include storing, responsive to determining the decreased reliability condition, data associated with the first physical storage unit using the second data recovery configuration. Data associated with the second physical storage unit may remain stored using the first data recovery configuration. Determining the change in the memory health state may include: determining at least one decreased reliability threshold; and evaluating the memory health data against the at least one decreased reliability threshold. The computer-implemented method may further include: collecting historical memory health data for a population of remote storage devices of a remote storage device type associated with the remote storage device; determining, based on the collected historical memory health data, a data reliability model for the remote storage device type; and determining, based on the data reliability model, at least one decreased reliability threshold, where determining the change in memory health includes evaluating the memory health data against the at least one decreased reliability threshold.

Another general aspect includes a system. The system includes a storage system configured to store, using a first data recovery configuration, a redundant set of data from a remote storage device; a memory health monitor configured to receive memory health data associated with the remote storage device, where the memory health data corresponds to a memory health state of a non-transitory medium of the remote storage device; a reliability manager configured to: determine, based on the memory health data, a change in a memory health state of the remote storage device; and initiate, responsive to the change in the memory health state, a second data recovery configuration, where the storage system is further configured to store, using the second data recovery configuration, redundant data from the remote storage device.

Implementations may include one or more of the following features. The remote storage device may be a non-volatile memory device at a site that is remote from the storage system and the storage system may be further configured to periodically store a difference between a current set of data stored on the remote storage device and a comprehensive copy of data stored on the remote storage device at an earlier time. The system may further include a backup interface configured to determine a periodic backup configuration for the remote storage device. The reliability manager may be further configured to: determine at least one initial memory health value for the remote storage device; and determine, based on the at least one initial memory health value and the periodic backup configuration, the first data recovery configuration. The reliability manager may be further configured to: determine a service level for at least one system resource of the storage system; determine, based on the service level, an allocation of the at least one system resource to storing redundant data in the storage system, where the first data recovery configuration is further based on the allocation of the at least one system resource; and determine, based on the allocation of the at least one system resource and the change in memory health state, the second data recovery configuration. The storage system may be further configured to: encode, responsive to the first data recovery configuration, the redundant set of data in a first plurality of encoded data symbols according to a first parity level; and encode, responsive to the second data recovery configuration, redundant data in a second plurality of encoded data symbols according to a second parity level. The second parity level may accommodate a different error rate for recovery of data than the first parity level. The system may further include a backup interface configured to receive backup data from the remote storage device according to a periodic backup schedule, where the memory health monitor may be further configured to receive memory health data from the remote storage device in conjunction with the backup interface receiving backup data according to the periodic backup schedule. The memory health monitor may be further configured to: determine a plurality of physical storage units in the remote storage device; store reference values that associate data stored in the storage system with the plurality of physical storage units storing corresponding user data in the remote storage device; and receive at least one memory health value for each physical storage unit of the plurality of physical storage units. The reliability manager may be further configured to: determine that at least one memory health value for a first physical storage unit of the plurality of physical storage units fulfills a decreased reliability condition; and determine that at least one memory health value for a second physical storage unit of the plurality of physical storage units does not fulfill the decreased reliability condition. The storage system may be further configured to store, responsive to determining the decreased reliability condition, redundant data associated with the first physical storage unit using the second data recovery configuration. The redundant data associated with the second physical storage unit may remain stored using the first data recovery configuration. The reliability manager may be further configured to: determine at least one decreased reliability threshold; and evaluate the memory health data against the at least one decreased reliability threshold. The reliability manager is further configured to: access historical memory health data for a population of remote storage devices of a remote storage device type associated with the remote storage device; determine, based on the historical memory health data, a data reliability model for the remote storage device type; determine, based on the data reliability model, at least one decreased reliability threshold; and evaluate the memory health data against the at least one decreased reliability threshold.

Another general aspect includes a system. The system includes: a storage system configured to store, using a first data recovery configuration, a redundant set of data from a remote storage device; means for receiving memory health data associated with the remote storage device, where the memory health data corresponds to a memory health state of a non-transitory medium of the remote storage device; means for determining, based on the memory health data, a change in a memory health state of the remote storage device; and means for initiating, responsive to the change in the memory health state, a second data recovery configuration, where the storage system is further configured to store, using the second data recovery configuration, redundant data from the remote storage device. The various embodiments advantageously apply the teachings of distributed storage networks and/or systems to improve the functionality of such computer systems. The various embodiments include operations to overcome or at least reduce the issues in the previous storage networks and/or systems discussed above and, accordingly, are more reliable and/or efficient than other computing networks. That is, the various embodiments disclosed herein include hardware and/or software with functionality to improve the use of storage resources by using memory health data to differentiate the data recovery configurations for backing up individual storage devices. Accordingly, the embodiments disclosed herein provide various improvements to storage networks and/or storage systems, particularly for cloud-based storage.

It should be understood that language used in the present disclosure has been principally selected for readability and instructional purposes, and not to limit the scope of the subject matter disclosed herein.

DETAILED DESCRIPTION

Figure 1:
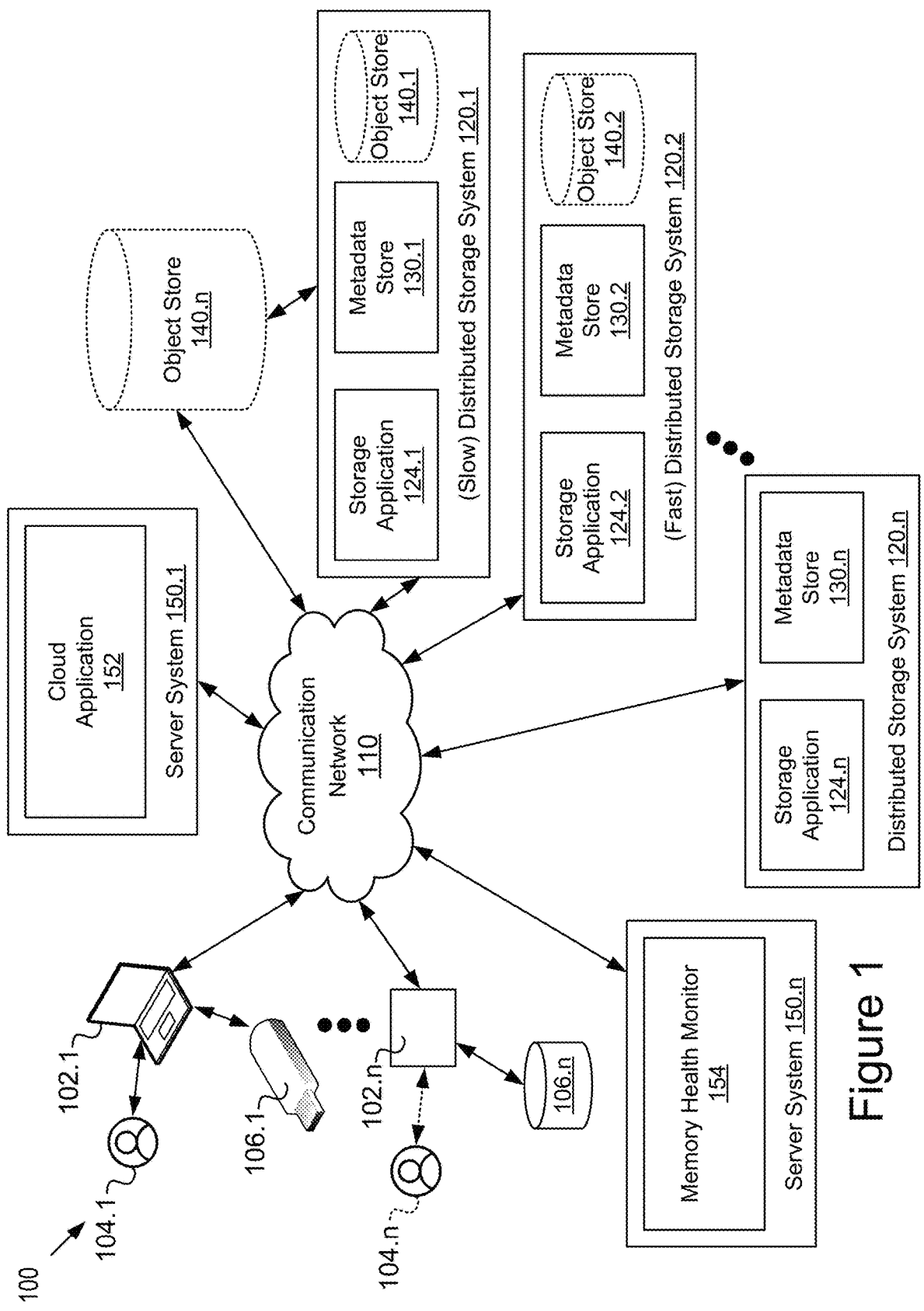
FIG. 1 schematically illustrates an example of a cloud-based system for backing up storage devices to a distributed storage system.

The embodiments below allow flexible cloud redundancy allocation, according to the user local storage memory health. For example, the buyer of an edge storage device product, like a flash drive or solid-state drive (SSD), may have the option to allow the manufacturer to track his storage memory health in order to better manage data backup and/or proactively warn the buyer of changes in memory health. The buyer may receive incentives for opting into the collection of memory health data from their storage devices, such as a reduced-price cloud services. The memory health information may be used by a cloud storage provider offering a cloud backup application to the buyer to optimize the backup storage allocation based on the memory health data.

The cloud storage provider may provide a distributed storage system that provides two levels of protection for data stored on a particular storage device. The backup service may include a full backup with ultra-slow recovery latency as a first level of backup—slow and cheap protection to store a snapshot of the entire contents of the storage device at a particular point in time. These full backups may be executed periodically according to a periodic backup schedule or other backup conditions. This first level of protection may be most useful for handling a sudden catastrophic loss of the storage device (e.g., due to theft, loss, or mechanical breakdown). Example slow storage systems may include redundant array of interconnected disks (RAID) systems and/or low-cost storage backup, such as tape, high capacity hard disk drives (HDD), X4 NAND flash memory, etc.

The second level of backup protection may include flexible protection with fast data recovery response time, such as frequent fast backup to store a delta between the data currently stored on the storage device and the most recent snapshot stored in the first level protection. This second level of protection may be most useful for handling gradual degradation in reliability of the storage device (e.g., high Bit-Error-Rate (BER) due to high write/erase cycles value). Example fast response storage systems may include servers and storage arrays configured with fast response memory, such as all flash storage arrays.

The edge storage device may be of any type, such as consumer or enterprise, SSD, HDD, hybrid drive, secure digital (SD) card, universal serial bus (USB) stick, or other form factors of flash drive. In the embodiments shown, the storage device is backed up to a distributed storage system, generally operating as a component of a cloud storage system. However, other storage system configurations are possible and the systems and methods described could be implemented for backup to a local storage system of any type, perhaps even to another edge storage device of the same type as the storage device being backed up.

In some embodiments, a cloud backup service may differentiate two types of reliability threats to the physical storage media of the storage device: gradual reliability degradation (high Bit-Error-Rate e.g. due to high W/E cycles value) and "catastrophic" sudden loss (events of: theft, lose, break down etc.). The cloud back service may therefore implement a two-level cloud protection of the data.

The first protection level may include full backup with ultra-slow recovery latency). In order to protect the "catastrophic" sudden loss events, the cloud provider may keep a full updated backup of the data, though it could be stored in very-high recovery latency durations. For example, for such rare event of storage device failure, the response time until providing the whole stored data set could be in the scale of hours. Slow and cheap backup methods for the whole device may be used for the proposed first protection level, such as RAID over multiple clients and/or low cost storage backup (tapes, low-cost HDD, X4 NAND, etc.).

The second protection level may include flexible protection for gradual reliability degradation (decreased reliability conditions based on memory health) with a fast data recovery response time. The second level of protection may allocate redundancy in a flexible manner based on the physical health of the storage device. Memory health parameters for the physical storage medium in each storage device are tracked by the storage device, and the memory health data may be sent to the storage system. The storage system may then use that information to dynamically allocate redundancy in the date recovery configurations of particular storage devices or even physical units (device, die, page/block, etc.) within those devices.

In order to protect against the gradual reliability degradation (i.e. high BER), a cloud service provider may be enabled with access to the memory health parameters collected by the storage devices. A storage memory manufacturer may include remote access to the physical health parameters of non-volatile memory devices in the storage device (conditioned on the user approval). Collection of memory health data may allow the storage memory manufacturer to provide memory-health alerts to the user, as well as providing further capabilities related to the cloud backup services of the user. Physical memory health parameters may include:

BER (Bit Error Rate) values
W/E (Write/Erase) cycle values
PLC (Program Loop Counter) values
ELC (Erase Loop Counter) values
Leak detection measurement values
EPD (Erratic Program Disturbance) error values
Bad blocks statistics
Voltage margin values.

This second protection level may be stored in fast response memory backup within a distributed storage system configured to allow quick recovery of the data. The storage system may utilize the knowledge of the memory health data to adapt the optimal redundancy allocation. In some embodiments, the second protection level may be used to store the delta backup from the last time that a comprehensive copy of the whole-memory backup (first protection level) was completed. The delta backup may be the changes in data between a comprehensive copy made at an earlier time and the current set of data in the storage device.

FIG. 1 illustrates a block diagram of an example cloud-based system 100, in which tiered storage with memory health tracking for differentiated recovery configurations may be implemented for the fast storage system (second protection level). As shown, the system 100 includes client systems 102 (e.g., client systems 102.1 and 102.n), distributed storage systems 120.1, 102.2 . . . 120.n, object stores 140.1, 140.2 . . . 140.n associated with the distributed storage systems, and server systems 150 (e.g., server systems 150.1 and 150.n). The components 102, 120, 140, and/or 150, and/or their sub-components, may be interconnected directly or via a communication network 110. For simplicity in some cases, depending on context, client systems 102.1 . . . 102.n may also be referred to herein individually or collectively as client systems 102 or clients 102, distributed storage systems 120.1, 120.2 . . . 120.n may be referred to herein individually or collectively as distributed storage systems 120 or DSS 120, storage applications 124.1, 124.2 . . . 124.n may be referred to herein individually or collectively as storage applications 124, metadata stores 130.1, 130.2 . . . 130.n may be referred to herein individually or collectively as metadata stores 130, object stores 140.1, 140.2 . . . 104.n may be referred to herein individually or collectively as object stores 140, and server systems 150.1 and 150.n may be referred to herein individually or collectively as server systems 150.

Communication network 110 may include any number of private and public computer networks. Communication network 110 may include network(s) having any of a variety of network types, including local area networks (LANs), wide area networks (WANs), wireless networks, virtual private networks, wired networks, the Internet, personal area networks (PANs), object buses, computer buses, and/or a combination of any suitable communication mediums via which devices may communicate in a secure or insecure fashion.

Data may be transmitted via network 110 using any suitable protocol. Example protocols include, but are not limited to, transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), Web Socket (WS), wireless access protocol (WAP), various messaging protocols (short messaging service (SMS), internet message access protocol (IMAP), etc.), or other suitable protocols.

Client system 102 may comprise an electronic computing device, such as a personal computer (PC), a laptop, a smartphone, a tablet, a mobile phone, a wearable electronic device, server, server appliance, or any other electronic device or computing system capable of communication with communication network 110. Client system 102 may store one or more client applications in non-transitory memory, including internal memory (not shown) and/or storage devices 106.1-106.n, for use by users 104.1-104.n. Example external or removable storage devices 106 may include SSD, HDD, hybrid drive, secure digital (SD) card, universal serial bus (USB) stick, or other form factors of flash drive including a non-transitory storage medium. A client application may be executable by a computer processor of client system 102. In some example embodiments, a client application includes one or more applications such as, but not limited to, data storage applications, search applications, communication applications, productivity applications, game applications, word processing applications, or any other applications. A client application may include a web browser and/or code executable thereby in some cases.

In some embodiments, client system 102 may include an application for creating, modifying, and deleting objects, which may be stored in object store 140. For instance, the application may be specifically customized for communication with the cloud application 152 and/or storage application 124, such as an application adapted to configure and/or utilize programming interfaces of the storage application 124. In some embodiments, cloud application 152 and/or storage application 124 may embody backup applications for client system 102 and/or storage devices 106. For example, redundant copies of data units stored in the non-transitory memory of client system 102 and/or storage devices 106 may be stored as objects in object store 140 using storage application 124 and/or cloud application 152. In some embodiments, cloud application 152 hosted by the server system 150.1 may embody a client of the storage application 124, as it may access the functions of the storage application 124 using various programmatic interfaces surfaced thereby (e.g., to create, store, retrieve, delete, etc., objects stored in the object storage). Client systems 102 may be remote from distributed storage systems 120 and server systems 150 and connected only via communication network 110. For example, distributed storage systems 120 and/or server systems 150 may be located in secure sites, such as commercial data centers, and client systems 102 may be personal and business computer systems and storage devices operating at remote home, business, and mobile sites.

Client systems 102, distributed storage systems 120, and/or server systems 150 may send/receive requests and/or send/receive responses, such as but not limited to HTTP(S) requests/responses, to/from one another. Client system 102 may present information to users 104, such as visual, audio, tactile, and/or other information via output devices, such as displays, audio reproduction devices, vibration mechanism, etc., based on information generated by a client system 102 and/or received from server system 128 and/or distributed storage system 120.

Users 104 may interact with various client systems 102 to provide input and receive information. For instance, as illustrated, users 104.1 and 104.n may interact with client systems 102.1 and 102.n by utilizing the operating system and/or various applications executing on the client systems 102.1 and 102.n.

In some embodiments, a client application (e.g., a client application executing on client system 102, cloud application 152, etc.) may send a request (also referred to as an object storage request) to the distributed storage systems 120 or object stores 140 to store, update, delete, or retrieve a particular file, data object, or other data unit stored in distributed storage systems 120 and/or object stores 140 through the communication network 110. For example but not limitation, a user 104 may configure a backup application to periodically store backup data sets, such as comprehensive snapshots of a storage device or selected volumes or files therein and/or delta update of a changes since a prior snapshot or delta update, to the distributed storage systems 120 and/or object stores 140, in which case the backup application transmits a request to the distributed storage systems 120 or object stores 140 to store the update(s). A comprehensive copy of a storage device or selected volume, directory, bucket, etc. may include all data objects or files contained in the selected storage device or selected subdivision thereof.

An object storage request may include information describing an object being created and/or updated, such as a file name, the data comprising the update(s), a client identifier, an operation type, etc., and storage applications 124 may use that information to record the update(s), as described herein. In another example, a client application (e.g., an application executing on a client system 102, cloud application 152, etc.) may request an object or portion thereof, a list of objects matching certain criteria, etc., in which case the request may include corresponding information (e.g., an object identifier, search criteria (e.g., time/date, keywords, etc.), and receive an object list or the object itself from storage application 124. Numerous other use cases are also applicable and contemplated.

Storage application 124 may provide an object storage service, manage data storage using metadata stores 130 and object stores 140 (e.g., store, retrieve, and/or other manipulate data in the metadata stores 130 and the object stores 140, etc.), process requests received from various entities (e.g., client systems 102, server systems 150, local application, etc.), provide for concurrency, provide for data redundancy and replicate data, perform garbage collection, and perform other acts, as discussed further herein. Storage application 124 may include various interfaces, such as software and/or hardware interfaces (e.g., application programming interface(s) (API(s)) that may be accessed (e.g., locally, remotely, etc.) by components of the system 100, such as various client applications, cloud application 152, memory health monitor 154, etc.

In some embodiments, storage application 124 may be a distributed application that is implemented in two or more computing systems (e.g., distributed storage systems 120.1-120.n). For example, storage application 124 may be configured to provide a first protection level for backup data using a slow distributed storage system 120.1 and a second protection level for backup data using a fast distributed storage system 120.2. In some embodiments, object store 140 may comprise a plurality of storage devices, servers, software applications, and other components, such as but not limited to any suitable enterprise data grade storage hardware and software. In some embodiments, storage application 124 may be a local application receiving local and/or remote storage requests from other clients (e.g., local applications, remote applications, etc.).

In a non-limiting example, distributed storage system 120 may provide an object storage service, such as storage services providing enterprise-scale object storage functionality. Further examples of such storage services may include Amazon Simple Storage Service (S3) object storage service, as ActiveScale™, other local and/or cloud-based S3 storage systems/services.

Distributed storage system 120 may be coupled to and/or include an object store 140. Object store 140 may comprise one or more data stores for storing data objects. Object store 140 may be implemented across a plurality of physical storage devices. In some example embodiments, the plurality of physical storage devices may be located at disparate locations. Objects stored in object store 140 may be referenced by metadata entries stored in the metadata store 130. In some example embodiments, multiple copies of a given object or portions thereof (e.g., erasure-encoded copies) can be stored at different physical storage devices to protect against data loss through system failure or to have the object quickly accessible from different geographic locations.

Metadata store 130 may comprise a database that stores an ordered set of metadata entries. Entries may be stored responsive to object storage requests received by a storage service, such as but not limited to, put, get, delete, list, etc. The storage service provided by storage application 124 may instruct a metadata controller of metadata store 130 to record the data manipulation operations. For example, the storage service provided by storage application 124 can call corresponding methods of the metadata controller of metadata store 130 is configured to perform the various storage functions and acts as needed depending on the configuration.

In some embodiments, metadata store 130 may comprise a horizontally partitioned database having two or more shards, although other suitable database configurations are also possible and contemplated. As horizontal partitioning is a database design principle whereby rows of a database table are held separately, rather than being split into columns (which is what normalization and vertical partitioning do, to differing extents), each partition can form part of a shard, which may in turn be located on a separate database server or physical location. Depending on the configuration, in some implementations, database shards may be implemented on different physical storage devices, as virtual partitions on the same physical storage device, or as any combination thereof.

Metadata store 130 and/or object store 140 may be included in distributed storage system 120 or in another computing system and/or storage system distinct from but coupled to or accessible by distributed storage system 120. Metadata store 130 and/or object storage 140 include one or more non-transitory computer-readable mediums (e.g., such as those discussed with reference to the memory 316 in FIG. 3) for storing the data. In some implementations, metadata store 130 and/or the object store 140 may be incorporated with the memory 316 or may be distinct therefrom. In some implementations, metadata store 130 and/or the object store 140 may store data associated with a database management system (DBMS), such as one comprised by and/or controlled by storage application 124 and/or other components of the system 100. In some instances, the DBMS may store data in multi-dimensional tables comprised of rows and columns, and manipulate, e.g., insert, query, update and/or delete, rows of data using programmatic operations, although other suitable DBMS configurations are also applicable.

In some embodiments, server system 150.$n$ may host a memory health monitor 154, such as a monitoring application used by a storage memory manufacturer to collect memory health data from remote storage devices (e.g., client systems 102 and storage devices 106). For example, memory health monitor 154 may use permission-based access to receive periodic updates of memory health data from each monitored storage device. Memory health monitor 154 may be configured to process the received memory health data and provide alerts to users 104 when a change in memory health state is detected. In some embodiments, memory health monitor 154 may also be configured to provide memory health data and/or alerts regarding changes in memory health state to other systems and applications, such as cloud application 152 on server system 150.1 and/or storage application 124 on distributed storage system 120. In some embodiments, other systems or applications, such as cloud application 152 on server system 150.1 and/or storage application 124 on distributed storage system 120, may receive memory health data and/or alerts directly from client systems 102 and/or storage devices 106.

It should be understood that the system 100 illustrated in FIG. 1 is representative of an example system and that a variety of different system environments and configurations are contemplated and are within the scope of the present disclosure. For instance, in some further embodiments, various functionality may be moved between the server systems 150 and the distributed storage systems 120, from server systems 150 and the distributed storage system 120 to a client, or vice versa, modules may be combined and/or segmented into further components, data may be consolidated into a single data store or further segmented into additional data stores, and some implementations may include additional or fewer computing devices, services, and/or networks, and may implement various functionality client or server-side. Further, various entities of the system 100 may be integrated into a single computing device or system or additional computing devices or systems, etc.

Figure 2:
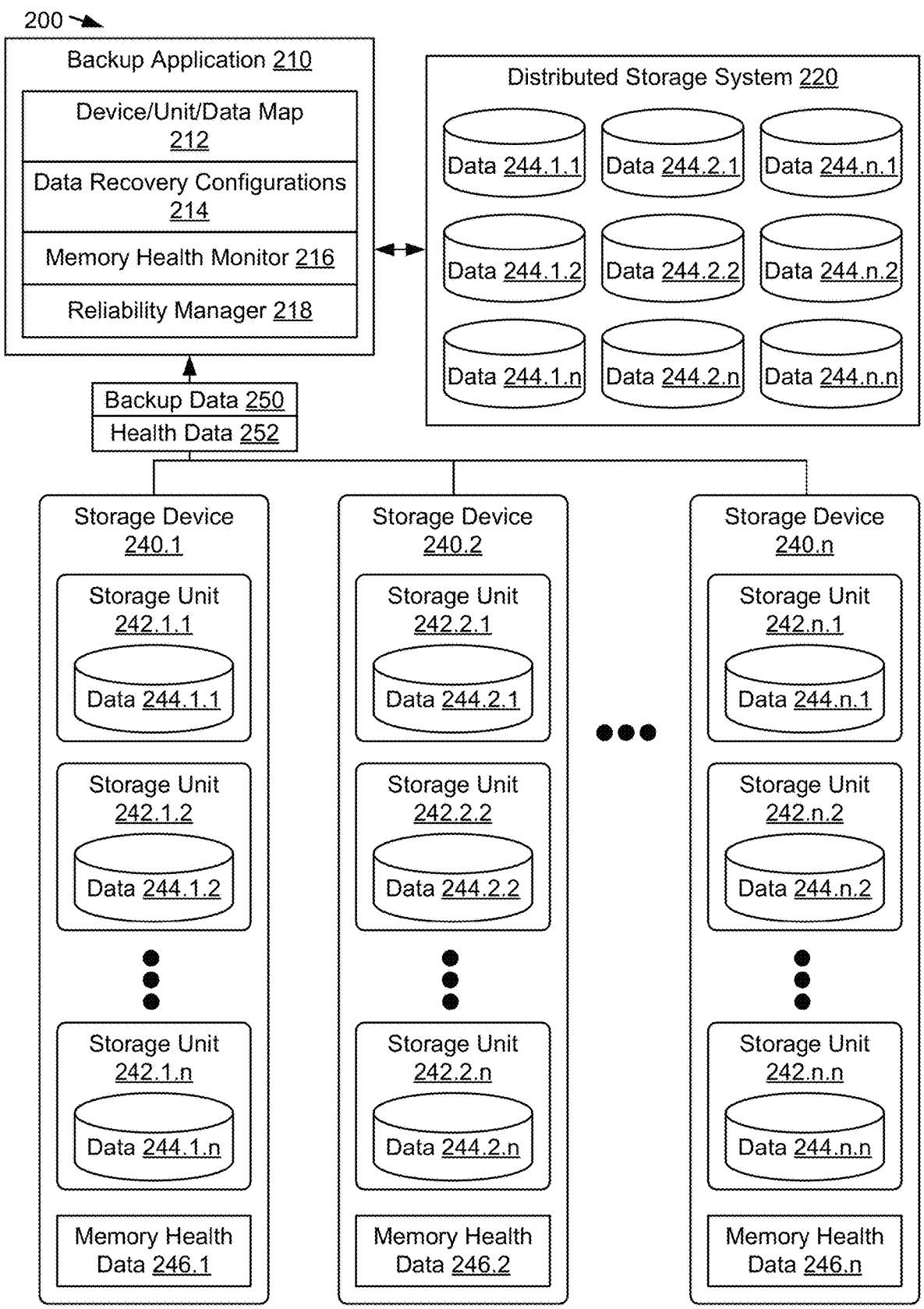
FIG. 2 schematically illustrates an example backup architecture that may operate in the system of FIG. 1.

FIG. 2 schematically shows selected components of a system 200 for providing differentiated data recovery configurations based on memory health data. In some embodiments, system 200 may be implemented in an architecture similar to system 100 in FIG. 1. Distributed storage system 220 may be configured similarly to distributed storage systems 120. Storage devices 240 may be configured similarly to storage devices 106 and/or internal storage devices of client systems 102. Backup application 210 and/or the components thereof may be hosted by client systems 102, distributed storage systems 220, server systems 150, and/or various combinations thereof.

Backup application 210 may include one or more software and/or hardware components for providing redundant backup for one or more storage devices 240. Data 244 from storage devices 240 may be backed up to distributed storage system 220. In the configuration shown, backup application 210 may be supported a fast storage system embodied in distributed storage system 220, such as described above for the second level of protection configured to address gradual degradation of storage reliability. More specifically, backup application 210 may be configured to support differentiated data recovery configurations in distributed storage system 220 based on changes in memory health data 246. In some embodiments, different data recovery configurations may be selected and mapped to backup data at the storage device and/or physical storage unit using data map 212. For example, backup application 210 may implement a hierarchical physical model for storage units 242 that enables different parity levels to be set at the erase block, page, die, and/or memory device level within storage devices 240.

Distributed storage system 220 may store redundant sets of data 244 from storage devices 240. For example, backup application 210 may store a backup copy of data stored in storage devices 240. In some embodiments, data 244 in distributed storage system 220 may be stored according to data recovery configurations 214 to provide additional redundancy and error correction for recovering lost or corrupted data. Backup application 210 may determine and assign data recovery configurations 214 to each data unit of data 244 as it is stored and/or reallocate data units based on changes in the memory health state of the physical memory device associated with the corresponding data 244 in storage devices 240. In some embodiments, distributed storage system 220 may include slow and fast storage options and data 244 may be stored in a combination of slow storage of comprehensive backups and fast storage of delta backups.

Storage devices 240 may include any number of edge storage devices, such as SSD, HDD, hybrid drive, secure digital (SD) card, universal serial bus (USB) stick, or other form factors of flash drive in standalone devices or integrated into a computer system, such as a personal computer (PC), a laptop, a smartphone, a tablet, a mobile phone, a wearable electronic device, smart appliance, internet-of-things (IoT) device, embedded system, server, server appliance, or any other electronic device with non-volatile memory, computer processing, and network communication capabilities. In some embodiments, storage devices 240 may include a plurality of physical storage units 242 embodying non-volatile memory for storing data 244. For example, storage units 242 may include memory devices, dies, media disks, and/or physical subunits thereof.

Storage devices 240 may each include one or more hardware and/or software modules for collecting memory health data 264 related to the non-transitory storage medium the storage device contains. For example, storage devices 240 may aggregate various measurements, counts, parameters, and other values and store them in a memory location for use by various storage device management functions within the storage device. Memory health data 246 stored in storage devices 240 may be accessible through a secure remote access or messaging protocol, such as internet protocols, remote memory access (RMA), etc. In some embodiments, storage devices 240 may host an application or service for supporting backup application 210 through an application programming interface (API). For example, storage devices 240 may send periodic backup data 250 from data 244 to backup application 210 and may include health data 252 from memory health data 246 as part of those messages or data exchanges.

As shown, backup application 210 may include: a data map 212 configured map data units (files, objects, blocks, etc.) from storage devices 240 to corresponding data locations in distributes storage system 220; data recovery configurations 214 configured to include a plurality of differentiated data recovery configurations that correspond to different error rates handled by each configuration; memory health monitor 216 configured to collect memory health data 246 from storage units 240; and reliability manager 218 configured to assess collected memory health data 246 and determine which data recovery configurations 214 should be used for backup data received from a specific storage device and/or storage unit. For example, backup application 210 may periodically receive backup data 250 and memory health data 252 in a message, session, or response from storage devices 240 and evaluate received memory health data 252 against decreased reliability thresholds to determine which data recovery configurations 214 should be used for the received backup data. Various components that may support the operation of backup application 210 in some embodiments is further described below with regard to FIG. 3.

Figure 3:
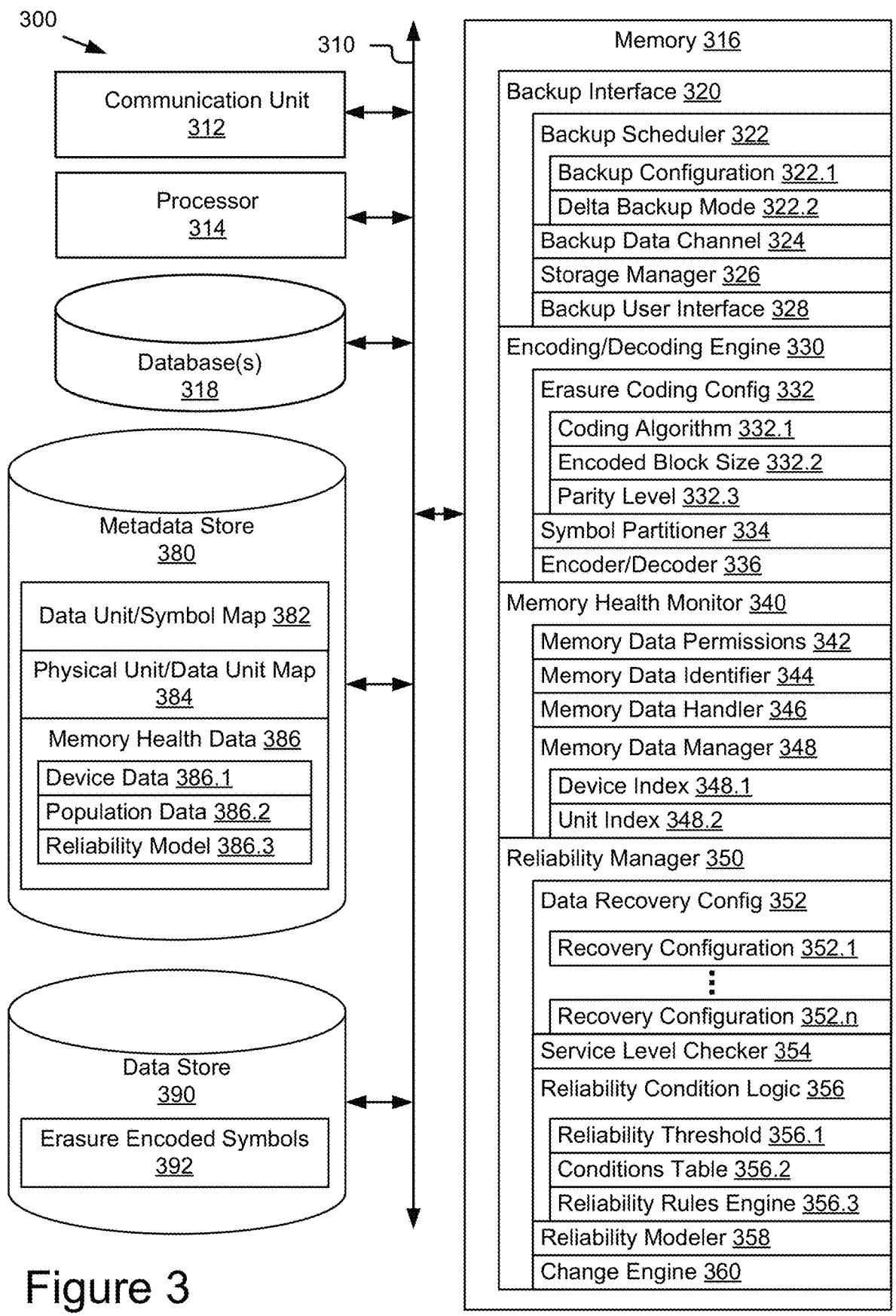
FIG. 3 schematically illustrates some example elements of a storage system for the system of FIG. 1.

FIG. 3 schematically shows selected modules of a server system, distributed storage system, and/or combination thereof hosting a backup application as described above. System 300 may include a bus 310 interconnecting at least one communication unit 312, at least one processor 314, and at least one memory 316. Bus 310 may include one or more conductors that permit communication among the components of system 300. Communication unit 312 may include any transceiver-like mechanism that enables system 300 to communicate with other devices and/or systems. For example, communication unit 312 may include wired or wireless mechanisms for communicating with file system clients, other access systems, and/or one or more object storage systems or components, such as storage nodes or controller nodes. Processor 314 may include any type of processor or microprocessor that interprets and executes instructions. Memory 316 may include a random access memory (RAM) or another type of dynamic storage device that stores information and instructions for execution by processor 314 and/or a read only memory (ROM) or another type of static storage device that stores static information and instructions for use by processor 314 and/or any suitable storage element such as a hard disc or a solid state storage element.

System 300 may include or have access to one or more databases and/or specialized data stores, such metadata store 380 and data store 390. Databases may include one or more data structures for storing, retrieving, indexing, searching, filtering, etc. of structured and/or unstructured data elements. In some embodiments, metadata store 380 may be structured as reference data entries and/or data fields indexed by metadata key value entries related to data objects stores in data store 390. Data store 390 may include data objects comprised of object data (such as host data), some amount of metadata (stored as metadata tags), and a globally unique identifier (GUID). Metadata store 380, data store 390, and/or other databases or data structures may be maintained and managed in separate computing systems, such as server nodes, storage nodes, controller nodes, or access nodes, with separate communication, processor, memory, and other computing resources and accessed by system 300 through data access protocols. Metadata store 380 and data store 390 may be shared across multiple storage systems.

Storage system 300 may include a plurality of modules or subsystems that are stored and/or instantiated in memory 316 for execution by processor 314. For example, memory 316 may include a backup interface 320 configured to receive, process, and manage backup data and related requests from one or more remote storage devices. Memory 316 may include an encoding/decoding engine 330 configured for encoding and decoding symbols corresponding to data units (files, objects, messages, etc.) stored in data store 390. Memory 316 may include a memory health monitor 340 configured for receiving and managing memory health data received from remote storage devices. Memory 316 may include a reliability manager 350 configured for managing different data recovery configurations used for storing backup data based on one or more memory health states of the storage devices. In some embodiments, backup interface 320, encoding/decoding engine 330, memory health monitor 340, and/or reliability manager 350 may be integrated into a backup application (such as backup application 210 in FIG. 2), a storage application (such as storage applications 124 in FIG. 1), and/or managed as separate libraries or background processes (e.g. daemon) through an API or other interface.

Backup interface 320 may include an interface protocol or set of functions and parameters for storing, recovering, and otherwise managing data backup requests from remote storage devices to data store 390. For example, backup interface 320 may include functions for reading, writing, modifying, or otherwise manipulating backup data objects and/or files, as well as their respective client or host data and metadata in accordance with the protocols of an object or file storage system. In some embodiments, backup interface 320 may implement a multi-level backup configuration that includes periodic full backups to slow storage and more frequent delta backups to fast storage. Backup interface 320 may be further configured to use differentiated data recovery configurations based on memory health data for storing backup data. For example, delta backups to fast storage may be configured to determine a memory health state and base selection of the data recovery configuration on the memory health state and/or changes therein.

In some embodiments, backup interface 320 may include a plurality of hardware and/or software modules configured to use processor 314 and memory 316 to handle or manage defined operations of backup interface 320. For example, backup interface 320 may include a backup scheduler 322, a backup data channel 324, a storage manager 326, and a backup user interface 328. For any given storage device, backup interface 320 may receive or initiate backup requests using backup scheduler 322 and backup data channel 324. These backup operations may include backup operations handled by storage manager 326, including encoding and decoding operations. In some embodiments, backup user interface 328 may be configured to enable user-initiated backups and/or setting backup configuration parameters used by backup scheduler 322.

Backup interface 320 may receive messages including backup data and parse them according to the appropriate communication and storage protocols. In some embodiments, backup interface 320 may identify a transaction identifier, a client identifier, an object identifier (object name or GUID), a data operation, and additional parameters, if any, for the backup data operation from the received message or messages that make up the backup data request.

Backup scheduler 322 may include an interface, function, or logic, as well as related data structures, for receiving backup data requests from remote storage devices and/or initiating backup data requests to remote storage devices on a defined schedule. For example, remote storage devices may send a backup data request over a network connection and addressed to system 300 or a port or component thereof, such as an API for backup data channel 324, according to a time or event-based schedule. Backup scheduler 322 may include a schedule definition and/or scheduling logic configured to determine when data backup communication should be initiated with a remote storage device. In some embodiments, backup scheduler 322 may be configured as an initiator of periodic backups and/or as a recipient of periodic backups initiated by remote storage devices. In some embodiments, backup scheduler 322 may include a backup configuration 322.1 and a delta backup mode 322.2.

For example, backup configuration 322.1 may include a plurality of backup configuration parameters that may be modified to vary operation of backup interface 320. In some embodiments, backup configuration 322.1 may be stored in a configuration file or similar data structure. For example, a default backup configuration and/or one or more user defined backup configurations may be generated and/or received through backup user interface 328. In some embodiments, backup configuration 322.1 may include allocation to backup levels, such as fast storage and/or slow storage, and/or definition of user backup service levels, such as backup tiers with regard to frequency of backup, terms of recovery (acceptable time to recover), security levels, and/or resource allocation, such as storage space allocation and/or other cloud resource allocation (e.g., processor, specialized hardware/software services, network resources, dedicated hardware, etc.). In some embodiments, backup configuration 322.1 may include a data structure or function defining a periodic backup schedule that initiates and/or receives backup data requests at predetermined intervals or based on other recurring trigger conditions.

In some embodiments, delta backup mode 322.2 may be a default backup mode and/or configurable though backup user interface 328 for storage in backup configuration 322.1. Delta backup mode 322.2 may include logic for identifying periodic complete backups of a remote storage device or a portion thereof and initiating incremental or delta backups configured to store a difference between the most recent full backup and a current state of the storage device. In some embodiments, a series of delta backups may be initiated between each complete backup and delta backups may themselves include all changes since the prior complete backup or changes since the immediately preceding delta backup, if any. Delta backups may be initiated by backup scheduler 322 and/or the remote storage device. In some embodiments, complete backups may be scheduled and initiated by backup scheduler 322 and delta backups may be initiated by the remote storage device responsive to changes in the data stored therein.

Backup data channel 324 may include a fixed or configurable network data path for receiving backup data from remote storage devices. Backup data channel 324 may include a combination of physical and/or logical networking configurations compatible with communication unit 312 and compatible interfaces, protocols, and/or parameters for receiving backup data from remote storage devices. In some embodiments, backup data channel 324 may support streaming, session-based protocols, and/or remote memory access to support efficient transfer of large amounts of backup data. In some embodiments, backup data channel 324 may operate independently from a messaging channel, such as internet communication using standard HTTPS, used for initiating and managing backup data channel 324. In some embodiments implementing delta backups, complete backups may be initiated through a high throughput backup data channel 324 and delta backups may be initiated through a general communication channel. In some embodiments, backup data channel 324 may receive both backup data and memory health data from the remote storage device, store the backup data to backup data objects in data store 390, and store memory health data to metadata store 380.

Storage manager 326 may include interfaces, functions, and/or parameters for reading, writing, and deleting data elements in data store 390. For example, object PUT commands may be configured to write object identifiers, object data, and/or object tags to an object store. Object GET commands may be configured to read data from an object store. Object DELETE commands may be configured to delete data from object store, or at least mark a data object for deletion until a future garbage collection or similar operation actually deletes the data or reallocates the physical storage location to another purpose.

In some embodiments, storage manager 326 may oversee writing and reading data elements that are erasure encoded on the storage medium on which data store 390 is stored. When a message or data unit, such as a file or data object, is received for storage, storage manager 326 may pass the file or data object through an erasure encoding engine, such as encoding/decoding engine 330. The data unit may be divided into data symbols and the symbols encoded into erasure encoded data symbols 392 for storage in data store 390. In some embodiments, the symbols may be distributed among a plurality of storage nodes to assist with fault tolerance, efficiency, recovery, and other considerations.

When the data unit is to be accessed or read, storage manager 326 may identify the storage locations for each symbol, such as using a data unit/symbol map 382 stored in metadata store 580. Erasure encoded data symbols 392 may be passed through an erasure decoding engine, such as encoding/decoding engine 330 to return the original symbols that made up the data unit to storage manager 326. The data unit can then be reassembled and used by backup interface 320 to complete a backup data recovery operation. Storage manager 326 may work with encoding/decoding engine 330 for storing and retrieving erasure encoded data symbols 392 in data store 390.

In some embodiments, storage manager 326 may include or interface with a metadata manager for creating, modifying, deleting, accessing, and/or otherwise managing object or file metadata, such as metadata stored in metadata store 380. For example, when a new object is written to data store 390, at least one new metadata entry may be created in metadata store 380 to represent parameters describing or related to the newly created object. The metadata manager may generate and maintain metadata that enables storage manager 326 to locate object or file metadata within metadata store 380. For example, metadata store 380 may be organized as a key-value store and object metadata may include key values for data objects and/or operations related to those objects that are indexed with a key value that include the object identifier or GUID for each object.

In some embodiments, storage manager 326 may use the metadata manager to store physical unit/data unit maps 384 and/or memory health data repository 386 in metadata store 380. For example, physical unit/data unit maps 384 may include entries of reference values, such as logical block addresses and storage unit identifiers, mapping physical storage units in the storage devices to the backup data units stored in those remote storage units, which may be updated and used by memory health monitor 340 and/or reliability manager 350. Memory health data repository 386 may include most recent and/or historical memory health data related to remote storage devices being backed up and/or similar populations and types of storage devices for use memory health monitor 340 and/or reliability manager 350.

Backup user interface 328 may include APIs, functions, and/or parameters for user configurable management of backup interface 320. For example, backup user interface 328 may provide a graphical user interface and underlying logic and data structures for enabling a user to manage backup scheduler 322 and/or configure backup data channel 324. In some embodiments, backup user interface 328 may be provided as a graphical user interface supporting internet protocols and accessible via communication unit 312 from one or more remote computer systems. For example. the user of a remote storage device may be able to securely log into backup user interface 328 from another computer system, such as the computer system including or connected to the remote storage device or another computer system accessible to the same user.

Encoding/decoding engine 330 may include a set of functions and parameters for storing, reading, and otherwise managing encoded data, such as erasure encoded data symbols 392, in data store 390. For example, encoding/decoding engine 330 may include functions for encoding a user data symbol into an erasure encoded data symbol and decoding an erasure encoded data symbol back into the original user data symbol. In some embodiments, encoding/decoding engine 330 may be included in the write path and/or read path for data store 390 that is managed by storage manager 326. In some embodiments, the encoding and decoding functions may be placed in separate encoding engines and decoding engines with redundant and/or shared functions where similar functions are used by both encoding and decoding operations.

In some embodiments, encoding/decoding engine 330 may include a plurality of hardware and/or software modules configured to use processor 314 and memory 316 to handle or manage defined operations of encoding/decoding engine 330. For example, encoding/decoding engine 330 may include an erasure coding configuration 332, a symbol partitioner 334, and encoders/decoders 336.

Erasure coding configuration 332 may include functions, parameters, and/or logic for determining the operations used to partition data units into symbols, encode, and decode those symbols. For example, various erasure coding algorithms exist for providing forward error correction based on transforming a message of a certain number of symbols into a longer message of more symbols such that the original message can be recovered from a subset of the encoded symbols. In some embodiments, a message may be split into a fixed number of symbols and these symbols are used as input for erasure coding. A systematic erasure coding algorithm may yield the original symbols and a fixed number of additional parity symbols. The sum of these symbols may then be stored to one or more storage locations.

In some embodiments, erasure coding configuration 332 may enable encoding/decoding engine 330 to be configured from available coding algorithms 332.1 and encoded block sizes 332.2 supported by data store 390. For example, coding algorithms 332.1 may enable selection of an algorithm type, such as parity-based, low-density parity-check codes, Reed-Solomon codes, etc., and one or more algorithm parameters, such as number of original symbols, number of encoded symbols, code rate, reception efficiency, etc. Encoded block size 332.2 may enable selection of a block size for encoded symbols. For example, the encoded block size may be selected to align with storage media considerations, such as an erase block size for sold state drives (SSDs), and/or a symbol size that aligns with data unit and/or subunit parameters for data operations. Erasure coding configuration 332 may also include a parity level 332.3. Parity level 332.3 may be a configurable parameter that determines the ratio between user data, such as host or backup data, and parity data. Parity level 332.3 may determine how many symbols can be corrupted or lost and still recover the entire message. In some embodiments, parity level 332.3 may correlate to the maximum error rate from which backup data may be recovered, with higher parity levels corresponding to higher allowable error rates, but also higher use of storage space for the additional parity symbols. In some embodiments, erasure coding configuration 332 may include an interface or API, such as a configuration service, to enable reliability manager 350 to select one or more parameters of coding algorithm 332.1, encoded block size 332.2, and/or parity level 332.3 to vary the data recovery configurations used for backup data from different remote storage devices and/or storage units therein.

Symbol partitioner 334 may include functions, parameters, and/or logic for receiving a message for encoding and partitioning the message into a series of original symbols based on the data in the message. For example, a default symbol partitioning operation may receive a message and use a symbol size defined by erasure coding configuration 332 to partition the message into fixed number of symbols for encoding.

Encoder/decoder 336 may include hardware and/or software encoders and decoders for implementing coding algorithm 332.1. For example, encoder/decoder 336 may include a plurality of register-based encoders and decoders for calculating parity for a symbol and returning erasure encoded data symbols 392. In some embodiments, encoder/decoder 336 may be integrated in the write path and read path respectively such that data to be written to storage media and read from storage media pass through encoder/decoder 336 for encoding and decoding in accordance with coding algorithm 530.1.

Memory health monitor 340 may include a set of functions and parameters for collecting memory health data from remote storage devices for use by reliability manager 350 and other system function. For example, memory health data may be collected from remote storage devices through backup interface 320 or another data channel and stored in memory health data repository 386 in metadata store 380. Memory health monitor 340 may receive memory health data including one or more parameters related to the function of storage media in the remote storage device and correlating to a memory health state. In some embodiments, memory health monitor 340 is integrated with backup interface 320 and/or reliability manager 350. In some embodiments, memory health monitor 340 may be a separate function or service operated to monitor remote devices and report memory health data parameters and/or other operation parameters for use in storage device management, quality, security, and other services.

In some embodiments, memory health monitor 340 may include a plurality of hardware and/or software modules configured to use processor 314 and memory 316 to handle or manage defined operations of memory health monitor 340. For example, memory health monitor 340 may include memory data permissions 342, memory data identifier 344, memory data handler 346, and/or memory data manager 348.

Memory data permissions 342 may include functions, parameters, and/or data structures for configuring and storing user or storage device owner permissions for accessing remote storage devices. For example, memory health monitor 340 may be configured to only access remote storage devices for which explicit permission to access has been granted by the user or owner. In some embodiments, remote storage devices may include a configuration tool that is launched from the storage device or as part of a storage device registration process and enables the user to grant access to memory health data collected by the storage device. For example, when the user selects or configures a backup service through backup user interface 328, the user may also be given the option to enable remote memory health monitoring. The memory data access permissions from storage device owners may be collected and stored in memory data permissions 342 and/or selectively accessible to memory data permissions 342, such as through a user profile or similar data structure available to system 300. In some embodiments, memory data permissions 342 may enable selection of specific data health parameters, collection frequency, permissible uses, and other configurable parameters to be used by memory health monitor 340.

Memory data identifier 344 may include functions, parameters, and/or logic for identifying one or more memory health data types that may be monitored by memory health monitor 340. Any storage device type may support a variety of operating parameters that may correspond to or function as memory health data indicative of memory health state. Storage devices may also vary on the memory health data parameters collected and whether they are configured for remote access. Reliability manager 350 may also be configured to support specific memory health data types. In some embodiments, memory health data types may include: BER values, W/E cycle values, PLC values, ELC values, leak detection measurement values, EPD error values, bad blocks values, voltage margin value, and other operating values related directly or indirectly to memory health state. In some storage devices, memory health data may include aggregate or derived values based on memory health data types and these aggregate or derived values may be managed as distinct memory health data types. In some embodiments, memory health data identifier 344 may include parameters for matching the memory health data collected from specific storage devices or types of storage devices with the memory health data types used by reliability manager 350 to determine reliability conditions. Memory health data identifier 344 may also include logic for tagging or locating the desired memory health data types received by memory data handler 346 and stores in memory health data repository 386.

Memory data handler 346 may include functions, parameters, and/or logic for receiving or identifying memory health data received by system 300. For example, memory data handler 346 may be configured to receive memory health data received from remote storage devices through backup data channel 324. In some embodiments, backup interface 320 may receive memory health data as part of messages or other data transfer from remote storage devices and store the memory health data and/or send the memory health data directly to memory data handler 346. In some embodiments, memory data handler 346 may parse and store memory health data in conjunction with memory data manager 348. In some embodiments, memory data handler 346 may be configured to operate independent of backup interface 320 for receiving memory health data from remote storage devices. For example, memory data handler 346 may include remote access functions for reading memory health data from remote storage devices over a network, such as the internet. Memory data handler 346 may include an API for receiving memory health data from remote storage devices through a direct addressing protocol or after it has been gathered and formatted by an intermediate system, such as a server system for collecting memory health data for a particular memory manufacturer.

Memory data manager 348 may include functions, parameters, and/or logic for storing and retrieving memory health data in metadata store 380, such as in memory health data repository 386. For example, memory data manager 348 may select and format memory heath data received by memory data handler 346 using memory health data types identified by memory data identifier 344. In some embodiments, memory data manager 348 may store memory health data in memory health data repository 386 using unique storage device identifiers in a device index 348.1. For example, the device index may include storage device identifiers for each remote storage device monitored by memory health monitor 340 and stored in device data 386.1. Each storage device entry in device data 386.1 may include one or more memory health data types and corresponding memory health data values. Device data 386.1 may be organized as a key-value store with multiple entries for each storage device representing different memory health data types and/or values from different collection time points. In some embodiments, memory data manager 348 may be configured to selectively return memory health data for a requested storage device, memory health data type, and/or time point or time period, such as an array of memory health data values corresponding to the desired parameters.

In some embodiments, memory health data may be further organized according to physical memory subunits of the storage devices by memory health monitor 340 and memory health data repository 386. For example, a flash storage device may include a plurality of flash storage dies as storage media within the storage device and identifiers for each of the dies may be included in memory health data to associate memory health data values with specific dies. In some embodiments, memory data manager 348 may include a unit index 348.2 for organizing and indexing the storage unit identifiers for storage units within each storage device. For example, unit index 348.2 may be an extension of device index 348.1 supporting one or more layers of hierarchical identifiers to enable division of storage devices into physical storage units for monitoring memory health data. In some embodiments, any number of hierarchical levels base on a physical hierarchy of storage medium subunits may be assigned identifier values and used to manage the monitoring, storage, and retrieval of memory health data based on storage units of physical storage media. In some embodiments, a data structure for mapping data units stored in data store 390 to the physical storage unit of the remote storage unit they came from may be included in physical unit/data unit map 384 in metadata store 380.

Reliability manager 350 may include a set of functions and parameters for managing different data recovery configurations for dynamically storing backup data based on the memory health data for the remote storage device containing the original data being backed up. For example, as backup interface 320 receives backup data from remote storage devices, reliability manager 350 may evaluate the memory health data gathered by memory health monitor 340 to determine which erasure coding configuration 332 should be used by encoding/decoding engine 330 when writing corresponding backup data objects into data store 390. Reliability manager 350 may be configured to optimize the use of storage space and/or other system resources based on the most recent memory health data available for the actual storage device and/or subunits thereof that are being backed up. Reliability manager 350 may change the data recovery configurations for backup data stored from a remote storage device over the life of the storage device based on changes in the memory health state and corresponding reliability condition of the remote storage device.

In some embodiments, reliability manager 350 may include a plurality of hardware and/or software modules configured to use processor 314 and memory 316 to handle or manage defined operations of reliability manager 350. For example, reliability manager 350 may include data recovery configurations, a service level checker 354, reliability condition logic 356, reliability modeler 358, and change engine 360. In some embodiments, reliability manager 350 may include or have access to memory data manager 348 and/or erasure coding configuration 332.

Data recovery configurations 352 may include functions, parameters, and/or data structures for defining a plurality of distinct data recovery configurations that may be used to store backup data in data store 390 with varying levels of error correction capabilities and/or acceptable error rates. For example, each recovery configuration 352.1-352.n may correspond to a different erasure coding configuration 332 that results in different configurations of erasure encoded data symbols 392 in data store 390. In some embodiments, data recovery configurations 352 may include a range of configurations based on a range and incremental values for a specific erasure coding parameter, such as parity level 332.3. In some embodiments, each of recovery configurations 352.1-352.n may correspond to a set of erasure coding configuration parameters, such as different coding algorithms 332.1, different block sizes 332.2, and/or different parity levels 332.3. In some embodiments, recovery configurations 352.1-352.n may be organized in a table, configuration files, or similar data structures. In some embodiments, recovery configurations 352.1-352.n may be determined functionally based on one or more functions and corresponding parameters that return the desired erasure coding configuration parameters.

Service level checker 354 may include functions, parameters, and/or logic for determining a service level associated with the remote storage device and/or an associated user/owner profile or service contract. For example, a remote storage device may be configured according to a particular offer for cloud-based backup storage and a number of service levels may be offered for the backup storage, such as frequency, storage space, recovery options, etc. These service levels may correspond to pricing tiers under a service level agreement or similar terms and conditions. In some embodiments, service level checker 354 may identify or determine one or more service level parameters that may impact the recovery configurations that are available to and/or selected by reliability manager 350 for backup data related to a particular storage device and corresponding service level agreement. For example, one or more service level parameters may be used by change engine 360 to determine the recovery configuration to be used based on the reliability condition.

Reliability condition logic 356 may include functions, parameters, and/or logic for determining or identifying a reliability condition or change in reliability condition based on memory health data. For example, reliability condition logic 356 may use one or more memory health data values associated with the remote storage device or a storage unit thereof as an index or input value for determining whether a reliability condition has decreased and a different data recovery configuration should be implemented for the storage device or storage unit going forward. In some embodiments, reliability condition logic 356 may receive one or more memory health data values as an input and provide a reliability condition value or decreased reliability condition state as an output. In some embodiments, reliability condition logic 356 may determine a change in the reliability condition of a storage device and identify that change to change engine 360 to determine the response of reliability manager 350 and system 300 to that change.

In some embodiments, reliability condition logic 356 may be based on one or more reliability thresholds 356.1 corresponding to one or more memory health data values or aggregate or derived values thereof. For example, memory health data for a particular storage device may include BER values over time for data read from the that storage device. Reliability condition logic 356 may implement a plurality of reliability thresholds based on BER values. For example, below a first BER reliability threshold value, the storage device may be considered to be in its primary operating condition and a high reliability condition. If the BER meets or exceeds the first BER reliability threshold value, but is below a second BER reliability threshold value, the storage device may be considered to in a fair operating condition with a normal reliability condition, a decreased reliability condition relative to the high reliability condition. If the BER meets or exceeds the second BER reliability threshold value, but is below a third BER reliability threshold value, the storage device may be considered to be in a degraded operating condition with an at-risk reliability condition, a decreased reliability condition relative to both the high and normal reliability conditions. If the BER meets or exceeds the third BER reliability threshold value, the storage device may be considered to be in a damaged operating condition with a critical risk reliability condition, a decreased reliability condition relative to the high, norm, and at-risk reliability conditions. These example thresholds and tiers are provided as examples only and the system may be implemented with any number of thresholds and decreasing reliability condition tiers.

In some embodiments, reliability condition logic 356 may include a reliability conditions table 356.2. For example, reliability conditions table 356.2 may map a plurality of memory health data types and values to reliability thresholds, such as reliability thresholds 356.1 for determining the reliability condition. In some embodiments, reliability conditions table 356.2 may define a multi-variable process for evaluating multiple memory health data types against multiple reliability thresholds to generate a single reliability condition value or state. For example, reliability conditions table 356.2 may embody varies ranges and logical combinations (and, or, nor, etc.) for evaluating different memory health data types, such as requiring that both BER and either PLC or ELC values exceed specific thresholds or fall in specific ranges to correlate to a change in reliability condition, such as a decreased reliability condition.

In some embodiments, reliability condition logic 356 may include a reliability rules engine 356.3. For example, reliability rules engine 356.3 may be embodied in a logical rule evaluator and a plurality of logical rules that define a reliability rules set. In some embodiments, reliability rules engine 356.3 may evaluate the reliability rules set for each backup data transaction and/or on a periodic basis to determine the reliability condition for the storage device or unit at the time of the most recent memory health data. In some embodiments, at least a portion of the reliability rules set may include reliability threshold comparisons as described above with regard to reliability threshold 356.1 and/or conditions table 356.2.

Reliability modeler 358 may include functions, parameters, and/or logic for modelling a plurality of memory health data parameters that correspond to changes in reliability condition. For example, reliability modeler 358 may use historical reliability data from a population of storage devices and corresponding memory health data to generate parameters and/or rules for reliability condition logic 356. In some embodiments, reliability modeler 358 may use population data 386.2 for a large number of storage devices of the same storage device type to derive reliability models 386.3. For example, population data 386.2 may include statistically significant numbers of storage devices of particular types, manufacturers, form factors, models, etc. that may be used to determine reliability models 386.3 that correspond to those device type parameters. In some embodiments, reliability models 386.3 may be used to determine reliability thresholds 356.1, parameters for conditions table 356.2, and/or reliability rules for reliability rules engine 356.3. In some embodiments, reliability modeler 358 may be based on statistical analysis of storage device populations, failure rates, and memory health parameters.

Change engine 360 may include functions, parameters, and/or logic for determining that a reliability condition has changed for a given storage device or physical storage unit thereof and generating a corresponding change in data recovery configuration. For example, reliability condition logic 356 may determine that a reliability threshold or other indicator has been met for a change in reliability condition and pass a changed reliability condition value to change engine 360. Change engine 360 may include an index or transfer function for determining a different data recovery configuration from data recovery configurations 352 for use in storing backup data from the storage device or storage unit with the changed reliability condition. Change engine 360 may pass the new data recovery configuration to backup interface 320 and/or encoding/decoding engine 330 for use in storing backup data from the storage device going forward.

In some embodiments, change engine 360 may also initiate reconfiguration of previously stored backup data from the storage device with the changed reliability condition. For example, change engine 360 may use physical unit/data unit map 384 to identify all data units that have been backed up from the effected storage device or storage unit and generate one or more commands to read and store data units previously stored with an earlier (with lower error rate tolerance) data recovery configuration in the new data recovery configuration (with a higher error rate tolerance). In some embodiments, reconfiguration of existing backup data may be performed as a background operation or lower priority task compared to new backup requests. In some embodiments, particularly those implementing delta backups, delta backups may immediately transition to the new data recovery configuration and the new data recovery configuration may be used for the next complete backup, but the prior complete backup may not be reconfigured for the new data recovery configuration.

Memory 316 may include additional logic and other resources (not shown) for processing data requests, such as modules for generating, queueing, and otherwise managing object or file data requests. Processing of a backup data request by backup interface 320 may include any number of intermediate steps that yield at least one back data request to data store 390.

Figure 4:
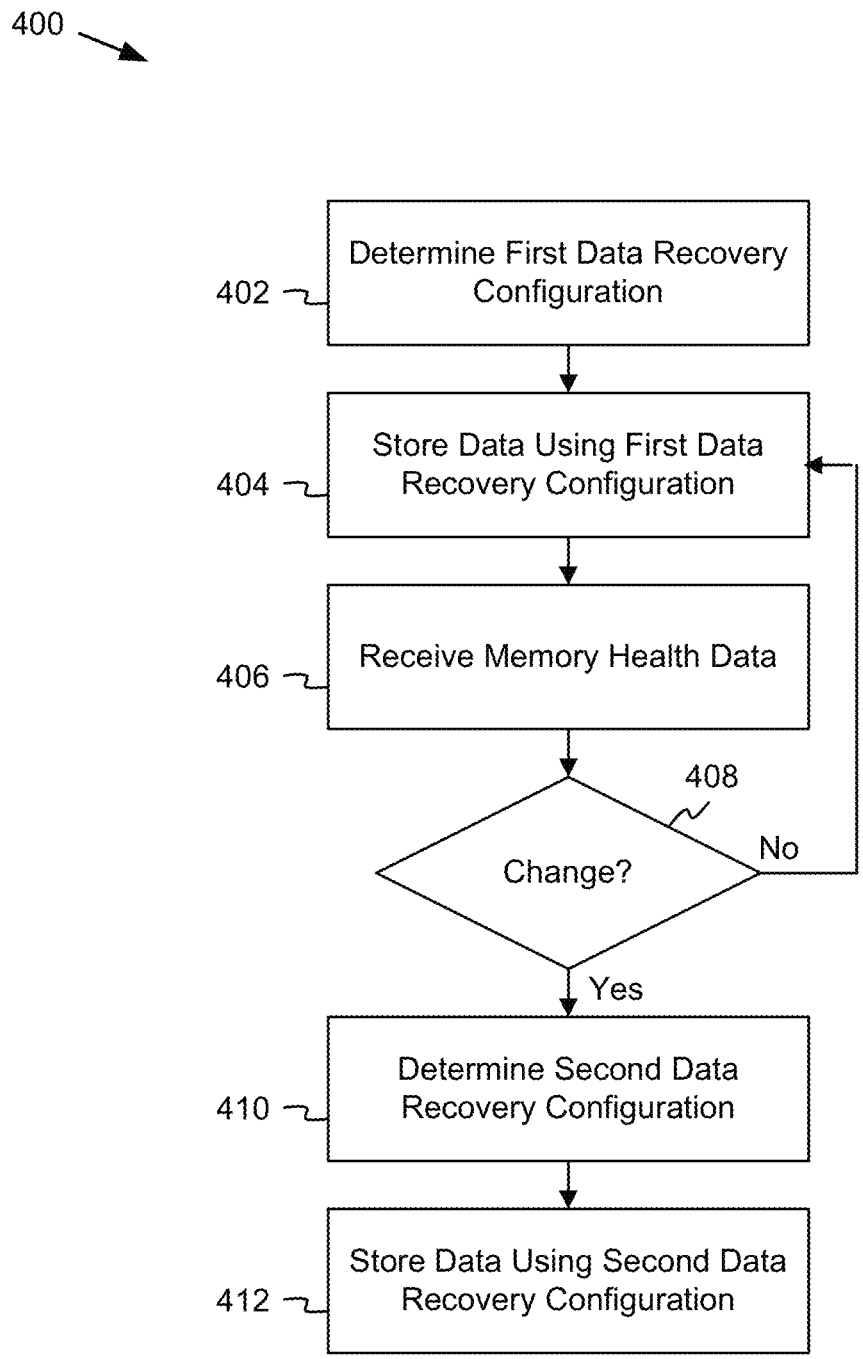
FIG. 4 illustrates an example method of differentiating data recovery configurations based on memory health data.

As shown in FIG. 4, the system 300 may be operated according to an example method of determining different data recovery configurations based on changes in memory health data, i.e. according to the method 400 illustrated by the blocks 402-412 of FIG. 4.

At block 402, a first data recovery configuration may be determined for a data unit to be stored from a remote storage device. For example, responsive to receiving a backup data request, a storage manager may determine, with the assistance of a reliability manager, a first data recovery configuration, such as the standard or initial data recovery configuration used by the storage system receiving the data unit.

At block 404, data corresponding to the data received from the remote storage device may be stored in a storage system using the first data recovery configuration. For example, the storage manager, with the assistance of an encoding/decoding engine, may store a data unit corresponding to at least a portion of the backup data request using the first data recovery configuration.

At block 406, memory health data may be received from the remote storage device. For example, a memory health monitor may receive memory health data from the remote storage device.

At block 408, memory health data may be evaluated for a change in reliability condition. For example, the reliability manager may compare memory health data received at block 406 with one or more reliability thresholds to determine whether the memory health data has had a significant change representative of a material change in reliability of the remote storage device. If no, there is no significant change and method 400 may return to block 404 to store the next data unit using the first data recovery configuration. If yes, there is a significant change in reliability and method 400 may proceed to block 410.

At block 410, a second data recovery configuration may be determined for a data unit to be stored from the remote storage device. For example, responsive to receiving a next backup data request, the storage manager may use a second data recovery configuration, such as a erasure coding configuration capable of handling higher error rates, determined by the reliability manager in response to the change determined at block 408.

At block 412, data corresponding to the data received from the remote storage device may be stored in the storage system using the second data recovery configuration. For example, the storage manager, with the assistance of the encoding/decoding engine, may store a data unit corresponding to at least a portion of the new backup data request using the second data recovery configuration.

Figure 5:
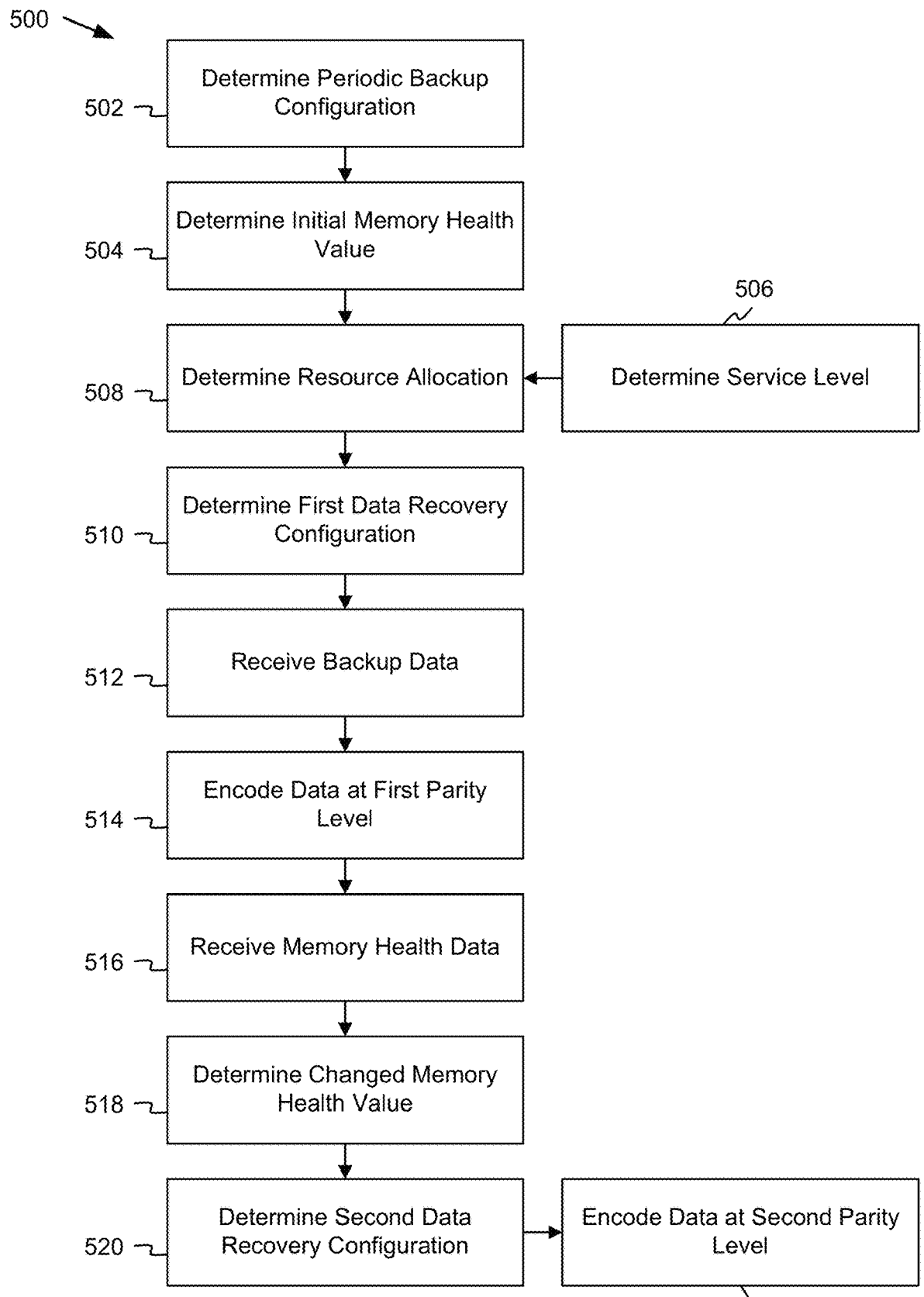
FIG. 5 illustrates an example method of managing backup configuration based on memory health data.

As shown in FIG. 5, the system 300 may be operated according to an example method of managing backup configuration based on memory health data, i.e. according to the method 500 illustrated by the blocks 502-522 of FIG. 5.

At block 502, a periodic backup configuration may be determined for a remote storage device. For example, a backup interface may include a backup scheduler configured to determine a time or event-based schedule for periodic backup of a remote storage device.

At block 504, an initial memory health value may be determined for the remote storage device. For example, initial memory health values may be received by a memory health monitor when the backup configuration is setup for the remote storage device.

At block 506, a service level may be determined for the remote storage device. For example, a service level may be associated with the remote storage device and/or user/owner of the storage device as part of the backup service through the backup interface.

At block 508, resource allocation for backup of the remote storage device may be determined. For example, the backup interface may use the service level determined at block 506 to determine the storage, processing, network, and/or other resources that may be used for the backup operations for the remote storage device.

At block 510, a first data recovery configuration may be determined for the storage device. For example, based on the initial memory health value and resource allocation, the reliability manager may determine a first data recovery configuration with a first error rate tolerance for storing backup data.

At block 512, backup data from the remote storage device may be received at the backup storage system. For example, a backup interface may receive backup data from the remote storage device in accordance with the periodic backup configuration determined at block 502.

At block 514, data from the remote storage device may be encoded and stored in the storage system at a first parity level. For example, an encoding/decoding engine may encode data units corresponding to the backup data according to a parity level defined by the first data recovery configuration.

At block 516, memory health data may be received from the remote storage device. For example, a memory health monitor may receive memory health data from the remote storage device via the same data channel and/or messages as the backup data received at block 512.

At block 518, a changed memory health value may be determined for the remote storage device. For example, a reliability manager may evaluate the memory health data received at block 516 to determine whether a memory health value has changed such that the reliability condition of the storage device has decreased.

At block 520, a second data recovery configuration may be determined for the storage device based on the changed memory health value determined at block 518. For example, the reliability manager may use the changed memory health value to identify a decreased reliability condition that corresponds to a data recovery configuration with a higher error rate tolerance.

At block 522, data from the remote storage device may be encoded and stored in the storage system at a second parity level. For example, the encoding/decoding engine may encode data units corresponding to the backup data according to a parity level defined by the second data recovery configuration.

Figure 6:
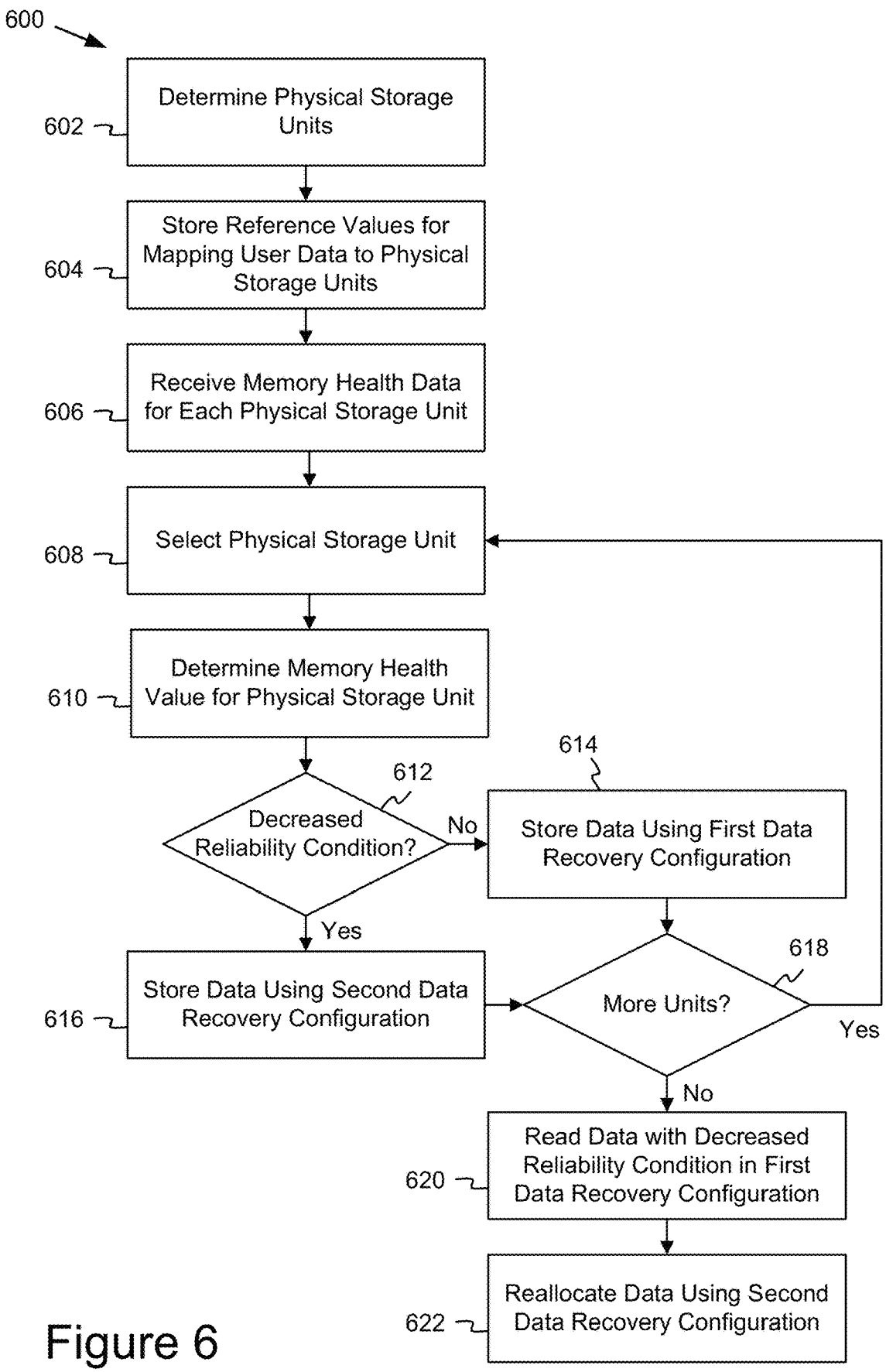
FIG. 6 illustrates an example method of differentiating data recovery configurations within storage units of a storage device based on memory health data.

As shown in FIG. 6, the system 300 may be operated according to an example method of differentiating data recovery configurations within storage units of a storage device based on memory health data, i.e. according to the method 600 illustrated by the blocks 602-622 of FIG. 6.

At block 602, a plurality of physical storage units within a storage device may be determined. For example, a remote storage device may be comprised of storage media including different dies for storing data that correspond to specific sets of physical addresses and the backup storage system may receive identifiers for the dies storing the original data units when those units are received for backup.

At block 604, reference values for mapping user data to physical storage units may be stored. For example, the backup interface may store storage unit/data unit map in metadata based on storage unit identifiers or reference values received from the remote storage device.

At block 606, memory health data may be received from the remote storage device for each physical storage unit. For example, the memory health monitor may receive memory health data values for each die or similar physical storage unit from which backup data has been received.

At block 608, a physical storage unit may be selected from the plurality of physical storage units. For example, the reliability engine may select a first physical storage unit to evaluate for decreased reliability and then systematically evaluate each one in sequence.

At block 610, a memory health value for the selected physical storage unit may be determined. For example, the memory health monitor may store received memory health values in a data structure that enables retrieval of values by physical storage unit for the reliability engine.

At block 612, the selected physical storage unit may be evaluated for a decreased reliability condition. For example, the reliability engine may evaluate the memory health values for the selected physical storage unit against a reliability threshold. If no, the selected storage unit does not have a decreased reliability condition and method 600 may proceed to block 614. If yes, the selected storage unit does have a decreased reliability condition and method 600 may proceed to block 616.

At block 614, data units from the selected physical storage unit may continue to be stored to the backup storage system to using the first data recovery configuration. For example, pending and future backup requests with the reference value or storage unit identifier matching the selected physical storage unit may be stored by the storage manager using the first data recovery configuration.

At block 616, data units from the selected physical storage unit may be stored to the backup storage system using the second data recovery configuration. For example, pending and future backup requests with the reference value or storage unit identifier matching the selected physical storage unit may be stored by the storage manager using the second data recovery configuration with a higher error rate tolerance.

At block 618, whether there are additional physical storage units to be evaluated may be evaluated. For example, the reliability manager may determine whether the selected physical storage unit is not the last physical storage unit in the storage device. If yes, there are more units to evaluate and method 600 may return to block 108 to select a next physical storage unit. If no, there are not more units to evaluate and method 600 may proceed to block 620.

At block 620, previously stored data from any physical storage units that now have a decreased reliability condition may be read from the backup storage system using the first data recovery configuration. For example, the reliability manager may initiate a reconfiguration of previously stored backup data that has a storage unit identifier or other reference value associated with physical storage units with decreased reliability conditions. In response, the storage manager may read the previously stored data according the data recovery configuration with which it was stored, such as the first data recovery configuration.

At block 622, the previously stored data may be reallocated in the backup storage system using the second data recovery configuration. For example, once the storage manager reads the previously stored data according to the data recovery configuration in which it was stored, the backup data units with the reference value or storage unit identifier matching the physical storage unit with decreased reliability condition may be stored using the second data recovery configuration with a higher error rate tolerance.

Figure 7:
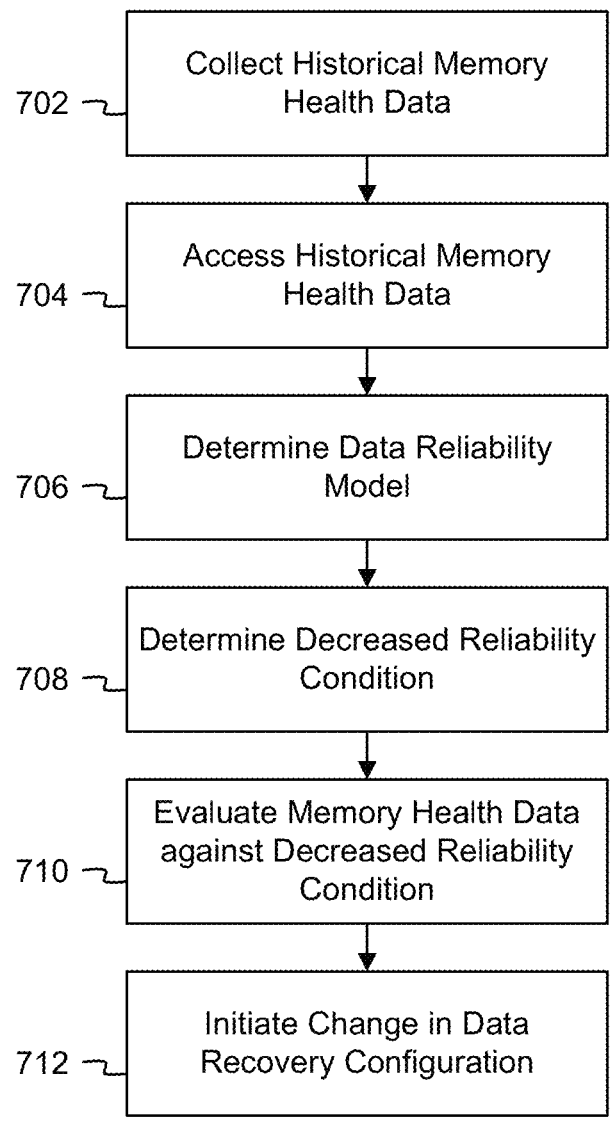
FIG. 7 illustrates an example method of using decreased reliability conditions to change data recovery configurations.

As shown in FIG. 7, the system 300 may be operated according to another example method of using decreased reliability conditions to change data recovery configurations, i.e. according to the method 700 illustrated by the blocks 702-712 of FIG. 7.

At block 702, historical memory health data may be collected for a population of storage devices. For example, memory health data may be aggregated in a memory health data repository from quality testing data, warranty and returns data, memory health monitoring, and other data sources that enable the memory health data to be associated with reliability outcomes for the population of storage devices.

At block 704, the historical memory health data may be accessed for analysis of reliability patterns and memory health data indicators. For example, a reliability modeler may be configured to identify historical data sources to be used for generating data reliability models for one or more storage device types.

At block 706, at least one data reliability model may be determined. For example, historical data may be analyzed by the reliability modeler using statistical modelling to determine memory health data types and thresholds that correlate to one or more tiers of decreased reliability.

At block 708, at least one decreased reliability condition that may be used to evaluate individual storage devices may be determined. For example, based on the data reliability model, a reliability manager may be configured with the selected memory health data types and corresponding thresholds to identify decreased reliability conditions.

At block 710, memory health data for a remote storage device may be evaluated against the decreased reliability condition. For example, the reliability manager may compare memory health data values of the selected memory health data types to the corresponding reliability thresholds from the data reliability model to identify storage devices that have reached the decreased reliability condition.

At block 712, a change in data recovery configuration may be initiated. For example, the reliability manager may select a different data recovery configuration with a higher error rate tolerance for incoming backup data requests from the storage device.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

What is claimed is:

1. A computer-implemented method, comprising:
storing, using a first data recovery configuration, a redundant set of data from a remote storage device to a distributed storage system, wherein the distributed storage system includes an array of non-volatile storage devices configured to store the redundant set of data from the remote storage device;
receiving memory health data associated with the remote storage device, wherein the memory health data corresponds to a memory health state of a non-transitory medium of the remote storage device;
determining, based on the memory health data, a change in the memory health state of the non-transitory medium of the remote storage device; and
reallocating, using a second data recovery configuration, the redundant set of data in the distributed storage system responsive to the change in the memory health state.

2. The computer-implemented method of claim 1, wherein:
the remote storage device is a non-volatile memory device at a site that is remote from the distributed storage system; and
reallocating the redundant set of data in the distributed storage system comprises periodically backing up a difference between a current set of data stored on the remote storage device and a comprehensive copy of data stored on the remote storage device at an earlier time.

3. The computer-implemented method of claim 1, further comprising:
determining a periodic backup configuration for the remote storage device;
determining at least one initial memory health value for the remote storage device; and
determining, based on the at least one initial memory health value and the periodic backup configuration, the first data recovery configuration.

4. The computer-implemented method of claim 3, further comprising:
determining a service level for at least one system resource of the distributed storage system;
determining, based on the service level, an allocation of the at least one system resource to storing the redundant set of data in the distributed storage system, wherein determining the first data recovery configuration is further based on the allocation of the at least one system resource; and
determining, based on the allocation of the at least one system resource and the change in the memory health state, the second data recovery configuration.

5. The computer-implemented method of claim 1, wherein:
storing, using the first data recovery configuration, the redundant set of data in the distributed storage system includes encoding the redundant set of data in a first plurality of encoded data symbols according to a first parity level;
reallocating, using the second data recovery configuration, the redundant set of data in the distributed storage system includes encoding at least a portion of the redundant set of data in a second plurality of encoded data symbols according to a second parity level; and
the second parity level accommodates a different error rate for recovery of the portion of the redundant set of data than the first parity level.

6. The computer-implemented method of claim 1, wherein the memory health data includes at least one memory health value selected from:
a bit error rate value;
a write/erase cycles value;
a program loop counter value;
an erase loop counter value;
a leak detection measurement value;
an erratic program disturbance value;
a bad blocks value; or
a voltage margin value.

7. The computer-implemented method of claim 1, further comprising:
receiving the redundant set of data from the remote storage device according to a periodic backup schedule, wherein receiving memory health data from the remote storage device is executed in conjunction with receiving the redundant set of data according to the periodic backup schedule.

8. The computer-implemented method of claim 1:
further comprising:
determining a plurality of physical storage units in the remote storage device; and
storing reference values that associate the redundant set of data stored in the distributed storage system with the plurality of physical storage units storing corresponding data in the remote storage device;
wherein:
receiving memory health data from the remote storage device includes receiving at least one memory health value for each physical storage unit of the plurality of physical storage units;
determining the change in the memory health state includes:
determining that at least one memory health value for a first physical storage unit of the plurality of physical storage units fulfills a decreased reliability condition; and determining that at least one memory health value for a second physical storage unit of the plurality of physical storage units does not fulfill the decreased reliability condition;

reallocating, using the second data recovery configuration, the set of redundant data in the distributed storage system includes storing, responsive to determining the decreased reliability condition, data associated with the first physical storage unit using the second data recovery configuration; and data associated with the second physical storage unit remains stored using the first data recovery configuration.

9. The computer-implemented method of claim 1, wherein determining the change in the memory health state includes:

determining at least one decreased reliability threshold; and evaluating the memory health data against the at least one decreased reliability threshold.

10. The computer-implemented method of claim 1, further comprising:

collecting historical memory health data for a population of remote storage devices of a remote storage device type associated with the remote storage device;

determining, based on the collected historical memory health data, a data reliability model for the remote storage device type; and determining, based on the data reliability model, at least one decreased reliability threshold, wherein determining the change in the memory health state includes evaluating the memory health data against the at least one decreased reliability threshold.

11. A system, comprising:

a storage system configured to store, using a first data recovery configuration, a redundant set of data from a remote storage device, wherein the storage system includes an array of non-volatile storage devices configured to store the redundant set of data from the remote storage device;

a memory health monitor configured to receive memory health data associated with the remote storage device, wherein the memory health data corresponds to a memory health state of a non-transitory medium of the remote storage device; and a reliability manager configured to:
determine, based on the memory health data, a change in a memory health state of the remote storage device; and
initiate, responsive to the change in the memory health state, a second data recovery configuration, wherein the storage system is further configured to store, using the second data recovery configuration, redundant data from the remote storage device.

12. The system of claim 11, wherein:

the remote storage device is a non-volatile memory device at a site that is remote from the storage system; and the storage system is further configured to periodically store a difference between a current set of data stored on the remote storage device and a comprehensive copy of data stored on the remote storage device at an earlier time.

13. The system of claim 11:
further comprising:
a backup interface configured to determine a periodic backup configuration for the remote storage device;

wherein:
the reliability manager is further configured to:
determine at least one initial memory health value for the remote storage device; and
determine, based on the at least one initial memory health value and the periodic backup configuration, the first data recovery configuration.

14. The system of claim 13, wherein:
the reliability manager is further configured to:
determine a service level for at least one system resource of the storage system;
determine, based on the service level, an allocation of the at least one system resource to storing redundant data in the storage system, wherein the first data recovery configuration is further based on the allocation of the at least one system resource; and
determine, based on the allocation of the at least one system resource and the change in the memory health state, the second data recovery configuration.

15. The system of claim 11, wherein:
the storage system is further configured to:
encode, responsive to the first data recovery configuration, the redundant set of data in a first plurality of encoded data symbols according to a first parity level; and
encode, responsive to the second data recovery configuration, redundant data in a second plurality of encoded data symbols according to a second parity level; and
the second parity level is configured to accommodate a different error rate for recovery of data than the first parity level.

16. The system of claim 11:
further comprising:
a backup interface configured to receive backup data from the remote storage device according to a periodic backup schedule;

wherein:
the memory health monitor is further configured to receive memory health data from the remote storage device in conjunction with the backup interface receiving backup data according to the periodic backup schedule.

17. The system of claim 11, wherein:
the memory health monitor is further configured to:
determine a plurality of physical storage units in the remote storage device;
store reference values that associate data stored in the storage system with the plurality of physical storage units storing corresponding user data in the remote storage device; and
receive at least one memory health value for each physical storage unit of the plurality of physical storage units;

the reliability manager is further configured to:
determine that at least one memory health value for a first physical storage unit of the plurality of physical storage units fulfills a decreased reliability condition; and
determine that at least one memory health value for a second physical storage unit of the plurality of physical storage units does not fulfill the decreased reliability condition;

the storage system is further configured to:
store, responsive to determining the decreased reliability condition, redundant data associated with the first physical storage unit using the second data recovery configuration; and redundant data associated with the second physical storage unit remains stored using the first data recovery configuration.

18. The system of claim 11, wherein:
the reliability manager is further configured to:
  determine at least one decreased reliability threshold; and
  evaluate the memory health data against the at least one decreased reliability threshold.

19. The system of claim 11, wherein:
the reliability manager is further configured to:
  access historical memory health data for a population of remote storage devices of a remote storage device type associated with the remote storage device;
  determine, based on the historical memory health data, a data reliability model for the remote storage device type;
  determine, based on the data reliability model, at least one decreased reliability threshold; and
  evaluate the memory health data against the at least one decreased reliability threshold.

20. A system, comprising:
a storage system configured to store, using a first data recovery configuration, a redundant set of data from a remote storage device, wherein the storage system includes an array of non-volatile storage devices configured to store the redundant set of data from the remote storage device;
means for receiving memory health data associated with the remote storage device, wherein the memory health data corresponds to a memory health state of a non-transitory medium of the remote storage device;
means for determining, based on the memory health data, a change in a memory health state of the remote storage device; and
means for initiating, responsive to the change in the memory health state, a second data recovery configuration, wherein the storage system is further configured to store, using the second data recovery configuration, redundant data from the remote storage device.

* * * * *